(12) United States Patent
Tyroller et al.

(10) Patent No.: US 6,885,966 B1
(45) Date of Patent: Apr. 26, 2005

(54) DEVICE FOR PROVIDING A SIGNAL IN RESPONSE TO A CHANGE OF THE AMBIENT PRESSURE

(75) Inventors: Tobias Tyroller, Regensburg (DE); Masataka Nakamura, Shiga (JP); Naoki Shimoyama, Shiga (JP); Mitsuru Yokota, Shiga (JP)

(73) Assignee: Siemens Aktiengesellschaft, Munich (DE)

( * ) Notice: Subject to any disclaimer, the term of this patent is extended or adjusted under 35 U.S.C. 154(b) by 15 days.

(21) Appl. No.: 10/363,163
(22) PCT Filed: Sep. 6, 2000
(86) PCT No.: PCT/DE00/03075
§ 371 (c)(1), (2), (4) Date: Jul. 23, 2003
(87) PCT Pub. No.: WO02/20313
PCT Pub. Date: Mar. 14, 2002

(51) Int. Cl.$^7$ .............................. G06F 15/00; B60Q 1/00
(52) U.S. Cl. ........................................ 702/138; 340/436
(58) Field of Search ..................... 702/138; 340/436; 280/734, 735; 180/274

(56) References Cited

U.S. PATENT DOCUMENTS

| 4,257,273 A | 3/1981 | Knowd | |
|---|---|---|---|
| 5,748,075 A | * 5/1998 | Dirmeyer et al. | 340/436 |
| 6,169,479 B1 | * 1/2001 | Boran et al. | 340/436 |
| 6,561,301 B1 | * 5/2003 | Hattori et al. | 180/274 |
| 6,668,238 B2 | * 12/2003 | Taruya et al. | 702/138 |
| 6,685,218 B1 | * 2/2004 | Breed et al. | 280/730.2 |

FOREIGN PATENT DOCUMENTS

| DE | 43 24 511 A1 | 1/1994 |
|---|---|---|
| DE | 198 58 760 A1 | 6/2000 |
| JP | 60003527 | 1/1985 |
| WO | WO 94/11223 | 5/1994 |

OTHER PUBLICATIONS

XP-002166360: "Device for measuring air pressure in tyres" c. 1993.

BE420:Z235: "Halbleiter-Schaltungs-technik" c. 1990.

* cited by examiner

*Primary Examiner*—John Barlow
*Assistant Examiner*—Toan M. Le
(74) *Attorney, Agent, or Firm*—Morrison & Foerster LLP

(57) ABSTRACT

The invention relates to a device for providing a signal in response to a change of the ambient pressure, comprising a pressure sensor (S) for providing a pressure signal (DS) depending on an ambient pressure (p), and a signal processing unit (SVE) mounted downstream of the pressure sensor (S) and comprising at least one analog logarithmic system and at least one high-pass filter system.

9 Claims, 4 Drawing Sheets

DEVICE FOR PROVIDING A SIGNAL IN RESPONSE TO A CHANGE OF THE AMBIENT PRESSURE

This application claims priority to International Application No. PCT/DE00/03075 which was published in the German language on Mar. 14, 2002.

TECHNICAL FIELD OF THE INVENTION

The present invention relates to a device for providing a signal in response to a change of the ambient pressure.

BACKGROUND OF THE INVENTION

Pressure sensors are present in motor vehicles for the purposes of detecting an impact, such pressure sensors being located, for example, in door cavities. These cavities are in such cases not hermetically sealed, so that the air pressure in the cavities, and therefore at the pressure sensor, matches the air pressure of the atmosphere in which the vehicle is located. If the car body around this cavity is deformed as a result of an impact, then depending on the type of impact the pressure in the area of the sensor can rise or fall briefly until equalization of the pressure with the ambient atmosphere is complete.

For the purposes of detecting an impact, brief pressure fluctuations of this type are evaluated at the sensor so as, depending on the evaluation, to activate safety systems such as airbags or belt tensioners. In known systems, the pressure sensor and associated evaluation circuit, usually a microcontroller, are housed as a unit in the motor vehicle cavity, the processing unit detecting rapid pressure fluctuations as a result of an impact and sending an activation signal to a control unit controlling the safety systems.

If the sensor and the evaluation circuit are to be located spatially separate from one another, for example when one or more evaluation circuits for various sensors in the vehicle are located at a central point, the signals generated by the pressure sensors have to be transferred over line connections to the control circuits. If one takes into account here that the pressure in the event of an impact is subject to relative fluctuations of between −3% and +20% and that atmospheric air pressure can assume values between 600 mbar and 1200 mbar, then sensor values have to be transferred for pressures between 582 mbar (97% of 600 mbar) and 1440 mbar (120% of 1200 mbar). In order to be able in the event of an impact to detect the comparatively small relative fluctuations of pressure at the sensor reliably using the pressure signal, a very high resolution i.e. a precise quantization of each sampled value transferred is required if the pressure signal is being transferred digitally. This makes the transfer of pressure signals expensive and complicated.

SUMMARY OF THE INVENTION

The present invention provides a device which generates from a pressure signal of a pressure sensor a signal which is sufficient for detecting a rapid change in pressure at the pressure sensor and which can be transferred digitally at no great cost.

In one embodiment, the device comprises a pressure sensor for providing a pressure signal depending on an ambient pressure and a processing unit mounted downstream of the pressure sensor, the processing unit comprising at least one analog logarithmic system and at least one high-pass filter system.

The device according to the invention generates the logarithm of the pressure signal and subjects the logarithmized pressure signal to high-pass filtering. The sensor signals which are in the present case of interest in respect of the pressure at the sensor follow a course which is at least approximately constant over a long period and, in so doing, are dependent on the atmospheric pressure. In the event of an impact, the pressure at the sensor rises briefly, only to fall again to the value of the atmospheric pressure and subsequently to remain constant. Through logarithmation and subsequent high-pass filtering of the pressure signal, a signal is applied at the output of the device according to the invention which for the duration of the change of pressure during the impact is proportional to the logarithm of the quotient obtained from the pressure at the sensor and the atmospheric pressure prevailing before and after the impact. To detect an impact, only the change of pressure at the sensor is required. The logarithmic signal generated by the device according to the invention depends exclusively on a change of the ambient pressure at the sensor. This change is between −3% and +20%, i.e. the pressure at the sensor can assume briefly a value between 97% and 120% of the atmospheric pressure which otherwise prevails. A signal with such a small dynamic behavior can be quantized at no great cost and transferred digitally to a control circuit for the safety systems.

One embodiment of the invention provides that the pressure signal is fed to an analog logarithmic system, an output signal of the analog logarithmic system being fed to a high-pass filter system.

The high-pass filter system preferably has a low-pass filter to which the output signal of the analog logarithmic module is fed and it preferably has a subtractor to which the output signal of the analog logarithmic module and the output signal of the low-pass filter are fed. Such an arrangement functions as a high-pass filter and is used when the production of a high-pass filter as a high-pass filter system is not possible or is not desired for some reasons.

A further embodiment of the invention provides that the high-pass filter system has a subtractor to which the output signal of the analog logarithmic module and a feedback signal applied at the output of a feedback path are fed, the feedback signal depending on an output signal of the subtractor. The feedback path in this case preferably comprises an analog-to-digital converter connected at the output of the subtractor, an integrator mounted downstream of the analog-to-digital converter and a digital-to-analog converter mounted downstream of the integrator. This arrangement which by means of the subtractor subtracts from the logarithmized pressure signal the average value of logarithmized pressure signals within a preceding time window also functions as a high-pass filter.

BRIEF DESCRIPTION OF THE DRAWINGS

Embodiments of the present invention are described in detail below with the aid of figures, in which.

Unless indicated otherwise, any given reference symbol in the figures designates the same part and has the same meaning.

DETAILED DESCRIPTION OF THE INVENTION

Figure 1:
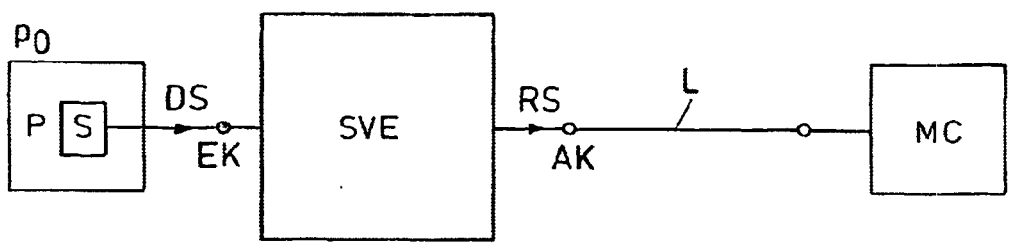
FIG. 1 shows a block diagram of a circuit arrangement according to the invention with a sensor and a signal processing unit which is connected via a line connection to a microcontroller.

FIG. 1 shows a block diagram of a device according to the invention comprising a pressure sensor S and a signal processing unit SVE. For a more precise understanding, in FIG. 1 an output terminal AK of the signal processing unit SVE is connected via a line connection L to a microcontroller MC. The pressure sensor S provides a pressure signal DS which depends on the pressure p surrounding the pressure sensor S. The pressure signal DS is fed to an input terminal EK of the signal processing unit SVE, a signal being applied at the output terminal AK of the signal processing unit SVE, said signal depending on a change in the ambient pressure p at the pressure sensor S.

The sensor S is accommodated for example in a cavity of the body of a motor vehicle, this cavity not being hermetically sealed and the car body being located in an atmosphere with an atmospheric pressure p0. Due to the non-hermetic seal, the pressure p in the cavity will under normal circumstances match the atmospheric air pressure p0 which is, however, subject to slow fluctuations. If in the event of an impact the cavity is deformed, then the pressure p surrounding the sensor S can rise or fall briefly until equalization of the pressure with the atmosphere surrounding the cavity has taken place. The output signal RS of the signal processing unit SVE depends exclusively on changes of the ambient pressure p at the sensor S relative to the atmospheric pressure p0 and not also on the atmospheric pressure p0 which depending on altitude can assume values between 600 mbar and 1200 mbar. The weather also has an effect on the atmospheric pressure. The relative changes of the pressure p in the event of an impact are between −3% and +20%.

Figure 2:
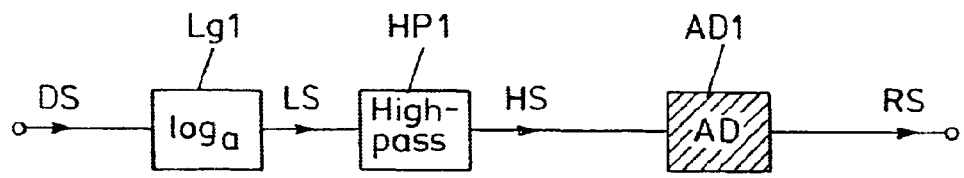
FIG. 2 shows an embodiment of a signal processing unit with an analog logarithmic module and a high-pass filter.

FIG. 2 shows a first embodiment of a signal processing unit SVE comprising an analog logarithmic module Lg1, a high-pass filter system HP1 mounted downstream of the logarithmic module Lg1 and an analog-to-digital converter AD1 mounted downstream of the high-pass filter HP1. The relative signal RS which depends on the changes of the pressure signal DS is available at the output of the analog-to-digital converter AD1 as a digital signal which can be transferred.

The mode of operation of the signal processing unit shown in FIG. 2 with an analog logarithmic module LG1 and a high-pass filter system HP1 is illustrated below by courses over time of the pressure signal DS plotted in FIG. 2, of an output signal LS of the logarithmic module Lg1 and of an output signal HS of the high-pass filter HP1.

Figure 3A:
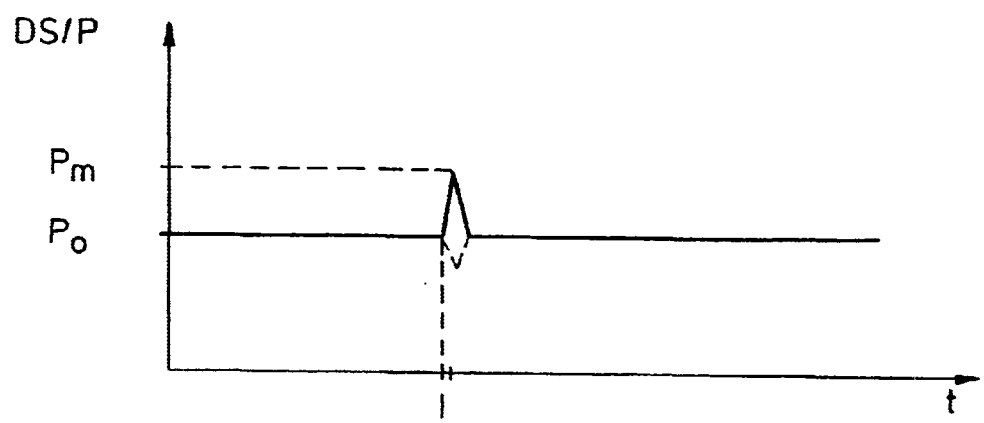
FIGS. 3a, 3b, and 3c show the course over time of selected signals in the processing unit according to FIG. 2.

FIG. 3a shows the typical course of the ambient pressure p of the pressure sensor S and of the pressure signal DS which depends on the ambient pressure p. For the explanation which follows, it is assumed that the pressure signal DS matches the pressure p. The ambient pressure p of the sensor S will under normal circumstances match the air pressure p0 of the atmosphere in which the vehicle is located. In the event of an impact on the cavity in which the sensor S is disposed, brief fluctuations of the ambient pressure p occur, said fluctuations resulting from a deformation of the cavity and continuing until such time as equalization of the pressure has taken place between the deformed cavity and the ambient atmosphere. The ambient pressure p can, as plotted in FIG. 3a from time ta, rise or, as plotted as a dotted line, fall. The course of the pressure exhibits an impulse at the moment of the impact, a peak value pm of the impulse usually being no more than the 1.2 times the atmospheric pressure p0. The minimum value of the ambient pressure p where there is a fall in pressure in the event of the impact is usually no less than 0.97 times the atmospheric pressure p0.

At the output of the analog logarithmic module Lg1 a signal LS is applied which matches the logarithmized pressure signal DS and the logarithmized ambient pressure P. Any conventional analog logarithmic module, such as is known, for example, from Tietze, Schenk: "Halbleiter-Schaltungstechnik" [Semiconductor circuit engineering], 9th edition, Springer Verlag, Berlin, 1991, p. 332 ff., can be used as logarithmic module Lg1. The logarithmic module Lg1 generates the logarithm of the pressure signal DS to base a, where base a can assume virtually any values and in particular 10 to generate the decadic logarithm and e to generate the natural logarithm.

Figure 3B:
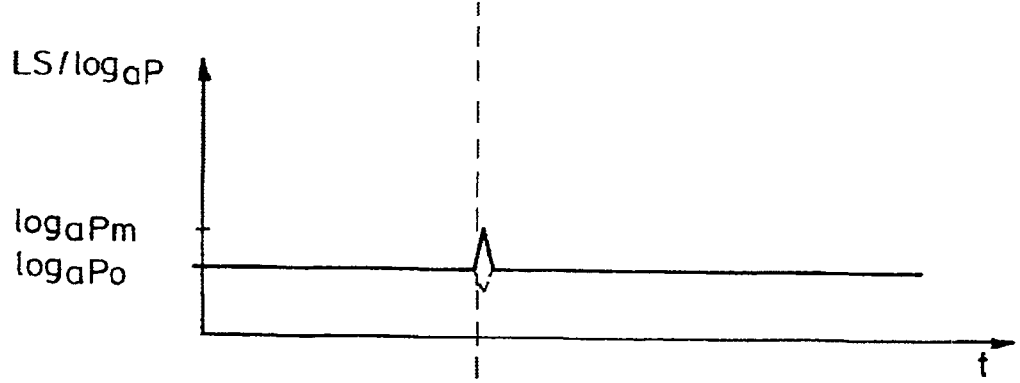

FIG. 3b shows the course over time of the output signal LS of the logarithmic module Lg1, said output signal also exhibiting at time ta an impulse the maximum value of which corresponds to the logarithm to base a of the maximum pressure value pm (loga (pm)). The output signal LS otherwise has a value which corresponds to the logarithm to base a of the atmospheric pressure p0 (loga (p0)).

At the output of the high-pass filter HP1 an output signal HS is applied which essentially matches the logarithmic signal LS which is reduced by the same proportion loga (p0). The high-pass filter HP1 is preferably selected such that the impulse of the logarithmic signal LS remains in its form at least approximately unchanged by the high-pass filtering.

The output signal HS of the high-pass filter HP1 is proportional to loga(p)−loga(p0) and, taking into account mathematical rules for calculating the logarithm, proportional to loga(p/p0), i.e.

$$HS \sim loga(p) - loga(p0) = loga(p/p0)$$

If $$r = (p - p0)/p0$$

is inserted into this relation, then the following applies:

$$HS \sim loga(r+1)$$

Here, r is the relative deviation of the ambient pressure p at the sensor S from the atmospheric pressure p0 in the event of an impact. To detect an impact, it is sufficient to know the value of the relative deviation r of the pressure p from the ambient pressure p0. This value is normally 0 and can fall in the event of an impact as low as −0.03 or rise as high as 0.2. A signal with such a small fluctuation margin can be transferred very accurately.

The value loga (r+1) is, to a close approximation, proportional to r for these values of r, so that a signal is applied at the output of the high-pass filter HP1, said signal being proportional to relative changes r of the ambient pressure p at the sensor S.

This analog relative signal is converted by the analog-to-digital converter into a digital signal and can then be transferred via the line L to a control unit for safety systems, which control unit can, depending on the signal, trigger a safety system, for example, an airbag. Changes of the atmospheric air pressure occur very slowly by comparison with the signal impulses in the event of an impact so that these changes are filtered out by the high-pass filtering. The output signal HS of the high-pass filter HP1 is quantized by the analog-to-digital converter in a known way and preferably converted into a digital word of length n. The number of quantization steps is then 2n, where n is selected such that the digital signal has an adequate resolution for detecting pressure fluctuations as a result of an impact.

Figure 4:
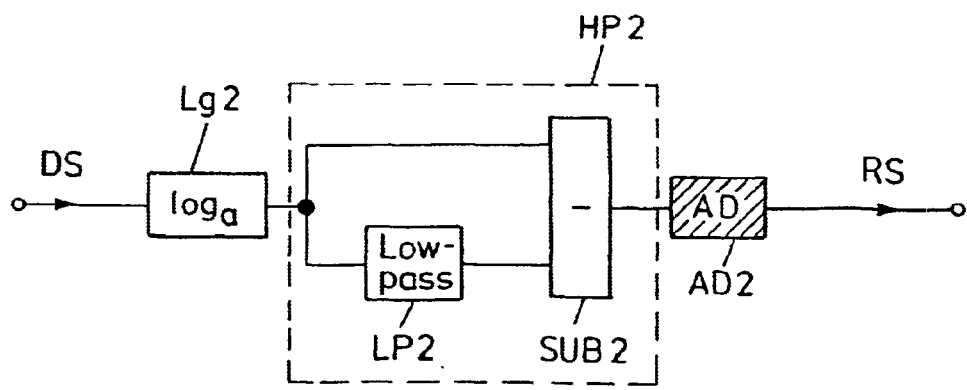
FIG. 4 shows an embodiment of a signal processing unit with a high-pass filter system comprising a low-pass and a subtractor.
Figure 3C:
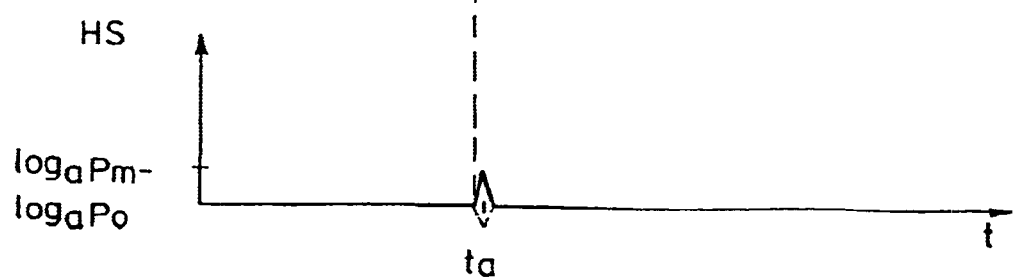

FIG. 4 shows a further embodiment of a signal processing unit, wherein the pressure signal DS is fed to an analog logarithmic module Lg2, a high-pass filter system HP2 comprising a low-pass filter LP2 and a subtractor SUB2 being mounted downstream of the logarithmic module Lg2. An output signal of the logarithmic module Lg2 is fed both to an input of the subtractor SUB2 and to the low-pass filter Lg2, an output signal of the low-pass filter LP2 being fed to a further input of the subtractor SUB2. The subtractor SUB2 subtracts the logarithmized pressure signal from the low-pass-filtered logarithmized pressure signal. At the output of the low-pass filter, which is fashioned such that it filters out impulses of the logarithmized pressure signal caused by an impact, an essentially constant signal corresponding to the logarithm of the atmospheric pressure p0 is applied. The signal applied at the output of the subtractor SUB2 then matches the signal shown in FIG. 3c, which signal, as explained above, is digitized by means of an analog-to-digital converter and transferred to a control unit.

Figure 5:
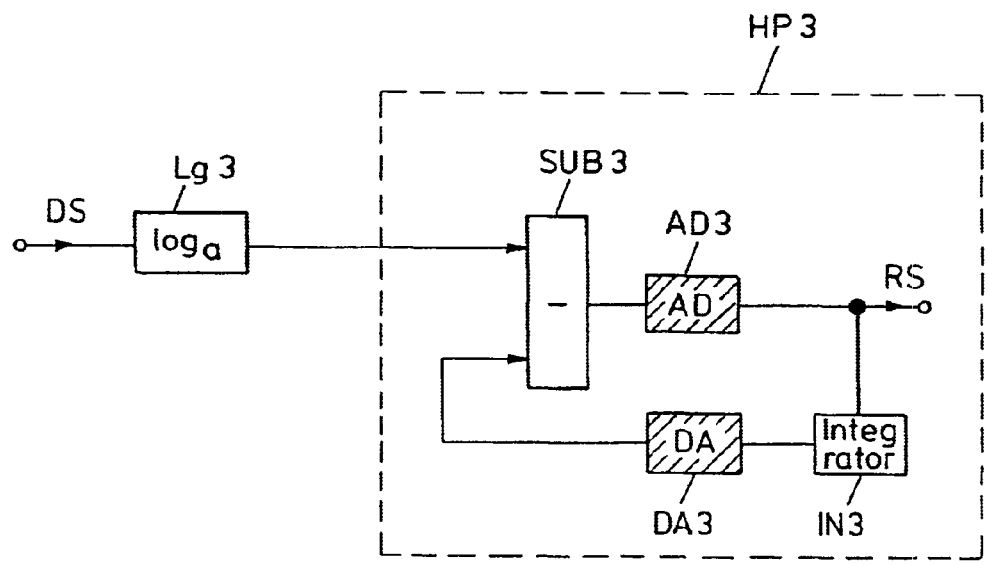
FIG. 5 shows a signal processing unit comprising a subtractor with feedback path as a high-pass filter system.

FIG. 5 shows a further embodiment of a signal processing unit according to the invention, wherein a high-pass filter system comprising a subtractor SUB3 and a feedback path is mounted downstream of an analog logarithmic module Lg3 to which the pressure signal DS is fed. An output signal of the logarithmic module Lg3 is in this case fed to an input of the subtractor SUB3. An output signal of the subtractor SUB3 is fed to an analog-to-digital converter AD3, at the output of which the relative pressure signal RS is applied, a sequence of output values of this relative pressure signal being cumulated by an integrator IN3 and after subsequent digital-to-analog conversion by a digital-to-analog converter DA3 fed to a further input of the subtractor SUB3.

Figure 6:
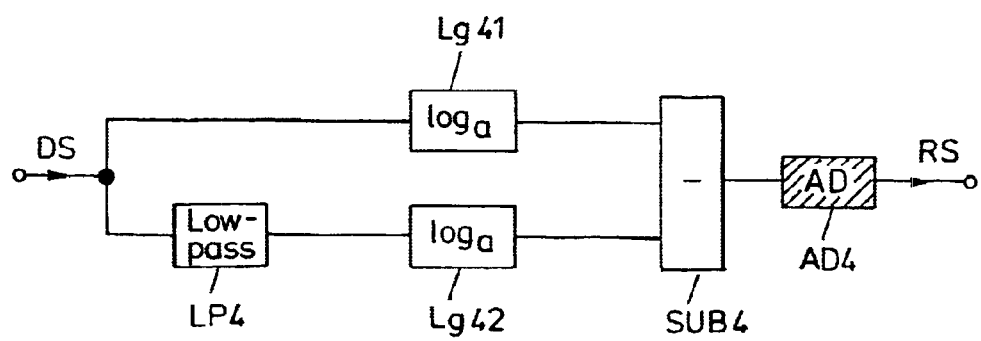
FIG. 6 shows a signal processing unit with two analog logarithmic modules.

FIG. 6 shows a further embodiment of a signal processing unit according to the invention, in which signal processing unit the pressure signal DS is on the one hand fed direct to an analog logarithmic module Lg41 and is on the other hand fed low-pass filtered by a low-pass filter LP4 to a second analog logarithmic module Lg42, a subtractor SUB4 subtracting the output signal of the second logarithmic module Lg42 from the output signal of the first logarithmic module Lg41. The output signal of the subtractor SUB4 matches in this case the signal shown in FIG. 3c. The output signal of the subtractor SUB4 is then subjected to analog-to-digital conversion by an analog-to-digital converter AD4, a digitized signal RS being provided at the output of the A/D converter AD4, which signal contains information relating to changes of the ambient pressure p at the pressure sensor S relative to the atmospheric pressure p0.

Figure 7:
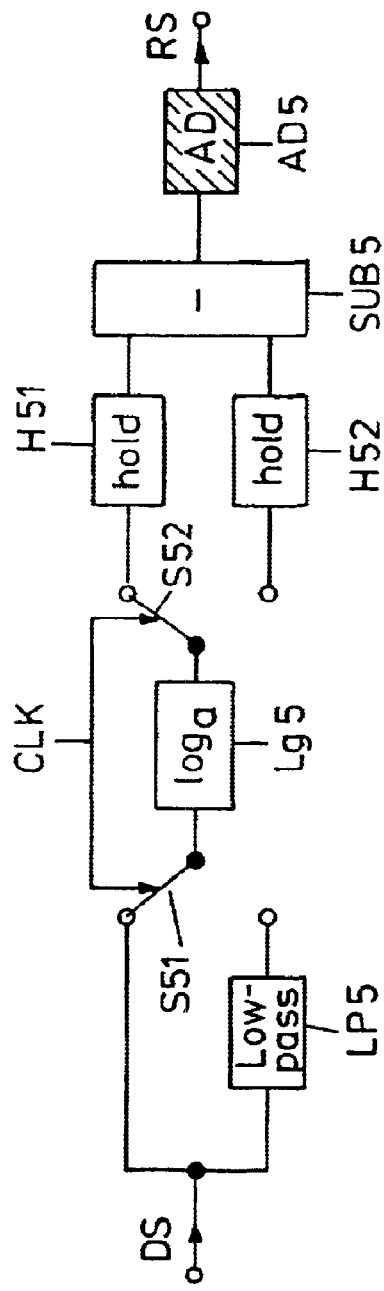
FIG. 7 shows a signal processing unit with a sample-and-hold device for the high-pass filtering of a logarithmized pressure signal.

FIG. 7 shows a further embodiment of a signal processing unit according to the invention, the signal processing unit having two processing branches which can be switched between by means of sampling devices S51, S52. An analog logarithmic module Lg5 is connected up between the sampling devices S51, S52. The sampling devices S51, S52 are controlled in accordance with a clock pulse CLK. The first sampling device S51 connects the logarithmic module Lg5 in accordance with the clock pulse CLK directly to the pressure signal DS or to an output of a low-pass filter LP5, the pressure signal DS being fed to an input of the low-pass filter LP5. The second sampling device S52 connects the output of the analog logarithmic module Lg5 in accordance with the clock pulse CLK to a first holding element H51 which is connected to a first input of a subtractor SUB5 or to a second holding element H52 which is connected to a second input of the subtractor SUB5. The sampling devices S51, S52 are controlled here such that the output signal of the logarithmic module Lg5 is fed to the first holding element H51 when the pressure signal DS is applied at the input of the logarithmic module Lg5, and the output signal of the logarithmic module Lg5 is fed to the second holding element H52 when the input of the logarithmic module Lg5 is connected to the output of the low-pass filter LP5. The subtractor SUB5 subtracts the output signal of the second holding element H52 from the output signal of the first holding element H51. The analog signal applied at the output of the subtractor SUB5 matches the signal shown in FIG. 3c, which signal is subsequently converted by means of an A/D converter AD5 into a digital signal RS.

Figure 8:
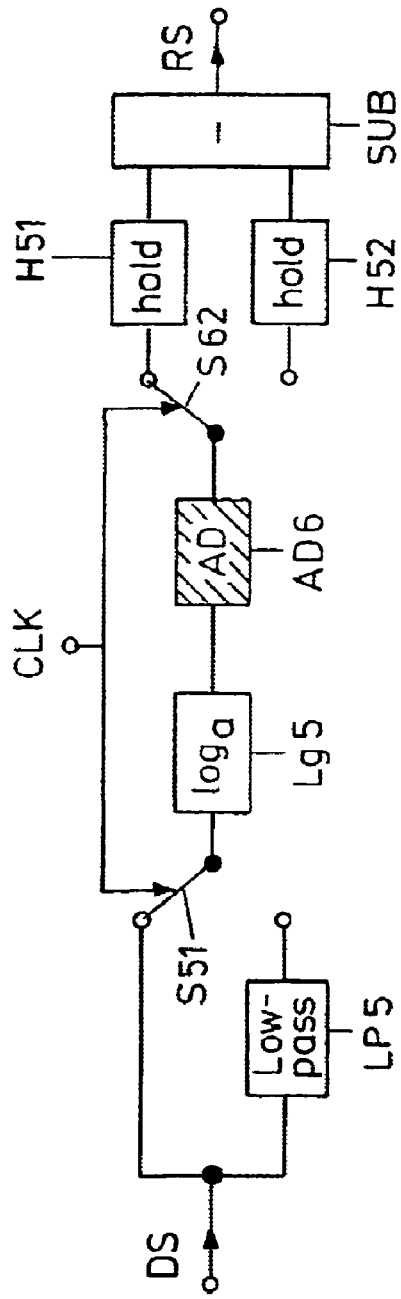
FIG. 8 shows a further embodiment of a signal processing unit with a sample-and-hold device for the high-pass filtering of a logarithmized pressure signal.

FIG. 8 shows a further embodiment of a circuit arrangement according to the invention, which circuit arrangement differs from the circuit arrangement shown in FIG. 7 in that an A/D converter AD6 is mounted downstream of the logarithmic module Lg5, said A/D converter sampling the analog output signal of the logarithmic module Lg5 and feeding the time-discrete sampled values via the second sampling device S52 in accordance with the clock pulse CLK to the first and second holding devices H51, H52. A time-discrete signal RS is applied at the output of the subtractor SUB5, which signal can optionally be digitized for further transfer. This signal RS also depends exclusively on changes of the ambient pressure p at the sensor S and not on the absolute value of the atmospheric pressure p0.

What is claimed is:

1. A device for providing a signal in response to a change of ambient pressure for detecting a pressure change as a result of an impact of a motor vehicle, comprising:
   a pressure sensor to provide a pressure signal depending on an ambient pressure; and
   a signal processing unit mounted downstream of the pressure sensor and having at least one analog logarithmic system and at least one high-pass filter system, wherein the pressure signal is fed to the analog logarithmic system and an output signal of the analog logarithmic system is fed to the high-pass filter system and an output signal of the high-pass filter system is fed to an analog-to-digital converter.

2. The device according to claim 1, wherein the high-pass filter system is a high-pass filter.

3. The device according to claim 1, wherein the high-pass filter system comprises a low-pass filter to which the output signal of the analog logarithmic module is fed and a subtractor to which the output signal of the analog logarithmic module and the output signal of the low-pass filter are fed.

4. The device according to claim 1, wherein the high-pass filter system comprises a subtractor to which the output signal of the analog logarithmic module and a feedback signal applied at an output of a feedback path are fed, the feedback signal depending on an output signal of the subtractor.

5. The device according to claim 4, wherein the feedback path has an analog-to-digital converter connected to the output of the subtractor, an integrator mounted downstream of the analog-to-digital converter and a digital-to-analog converter mounted downstream of the integrator.

6. The device according to claim 1, wherein the pressure signal is fed to a first analog logarithmic module and via a low-pass filter to a second analog logarithmic module, output signals of the first and second analog logarithmic module being fed to a subtractor.

7. The device according to claim 1, further comprising:

a low-pass filter to which the pressure signal is fed;

an analog logarithmic module;

a first switch arrangement via which the pressure signal or the output signal of the low-pass filter is fed to the analog logarithmic module in accordance with a clock pulse;

a first holding element connected to a subtractor and a second holding element connected to the subtractor; and a second switch arrangement via which an output signal of the analog logarithmic module is fed to the first or second holding element in accordance with the clock pulse.

8. The device according to claim 7, wherein an analog-to-digital converter is mounted downstream of the analog logarithmic module.

9. A method for providing a signal depending on changes of an ambient pressure for detecting a pressure change as a result of an impact of a motor vehicle, comprising:

providing a pressure signal depending on an ambient pressure by a pressure sensor; and generating a logarithm of the pressure signal, high-pass filtering of the logarithmized pressure signal.

* * * * *